(12) United States Patent
Bayliss, IV

(10) Patent No.: US 6,386,367 B1
(45) Date of Patent: May 14, 2002

(54) SAFETY PRESCRIPTION CONTAINER

(76) Inventor: Thomas Andrews Bayliss, IV, 200 Castle Ridge Rd., New Bern, NC (US) 28562

(*) Notice: Subject to any disclaimer, the term of this patent is extended or adjusted under 35 U.S.C. 154(b) by 0 days.

(21) Appl. No.: 09/789,681

(22) Filed: Feb. 21, 2001

Related U.S. Application Data

(60) Division of application No. 09/342,565, filed on Jun. 29, 1999, which is a continuation-in-part of application No. 09/178,980, filed on Oct. 26, 1998, now Pat. No. 6,036,017.

(51) Int. Cl.[7] .............................................. B65D 83/04
(52) U.S. Cl. .................... 206/534; 206/459.5; 215/227; 359/809; 359/819
(58) Field of Search ................................. 206/528, 534, 206/538–540, 459.5, 457; 220/376, 377; 40/310, 312; 215/227, 228; 359/436, 440, 804, 809, 819

(56) References Cited

U.S. PATENT DOCUMENTS

| | | |
|---|---|---|
| 2,961,108 A | 11/1960 | Johnson |
| 3,386,200 A | 6/1968 | Beretta |
| 4,436,213 A | 3/1984 | Paul, Jr. et al. |
| 4,695,954 A | 9/1987 | Rose et al. |
| 4,732,411 A | 3/1988 | Siegel |
| 4,733,362 A | 3/1988 | Haraguchi |
| 4,749,093 A | 6/1988 | Trick |
| 4,782,966 A | 11/1988 | Thackrey |
| 4,817,023 A | 3/1989 | Yamaguchi et al. |
| 4,918,604 A | 4/1990 | Baum |
| 4,976,351 A | 12/1990 | Mangini et al. |
| 5,092,477 A | 3/1992 | Johnson, Jr. et al. |
| 5,105,959 A | 4/1992 | Kinsley |
| 5,193,032 A | 3/1993 | Hirth |
| 5,204,775 A | 4/1993 | McDevitt |
| 5,265,744 A | 11/1993 | Duty et al. |
| 5,390,796 A * | 2/1995 | Kerfoot, Jr. .................. 206/534 |
| 5,400,915 A | 3/1995 | Kennedy |
| 5,439,721 A | 8/1995 | Pedroli et al. |
| 5,597,995 A | 1/1997 | Williams et al. |
| 5,803,283 A | 9/1998 | Barker et al. |
| 5,984,122 A * | 11/1999 | Barker et al. ................ 206/534 |

* cited by examiner

Primary Examiner—Luan K. Bui
(74) Attorney, Agent, or Firm—MacCord Mason PLLC

(57) ABSTRACT

A container for holding prescription pills or other medication that includes a cylindrical receptacle, a detachable cap, and a label. A pill holder is positioned beneath the cap, which includes a magnifying lens, through which the interior of the pill holder can be viewed. The label includes the name of the prescribed medicine and a picture of a pill. When the prescription if filled, one pill is placed in the pill holder. The pill and the pill picture can then be compared to determine if the correct medicine has been provided. The label is prepared by providing a processor having a keyboard, a database including data relating to images of a plurality of prescription medicine pills, a label printer, and a label; entering the name of the prescription medicine into the processor; selecting an image of a pill in the database using the name entered; and printing the name and the selected image onto the label.

10 Claims, 4 Drawing Sheets

SAFETY PRESCRIPTION CONTAINER

This application is a division of pending U.S. patent application Ser. No. 09/342,565, filed Jun. 29, 1999, which in turn is a continuation-in-part of U.S. patent application Ser. No. 09/178,980, filed Oct. 26, 1998 U.S. Pat. No. 6,036,017.

BACKGROUND OF THE INVENTION (1) Field of the Invention

The present invention relates generally to a container for holding prescription medicine in pill or capsule form, and in particular to a container incorporating features to reduce the risk of harm to the patient in the event that the prescription is erroneously filled.

(2) Description of the Prior Art

All too frequently, errors are made by pharmacists or their assistants in filling prescriptions. Some of these errors are caught by the patient who notices the difference in the medication compared to medication previously obtained for the same prescription. However, under certain circumstances, the patient may not notice the error. For example, the erroneous medication, e.g., a pill, and the correct pill may be similar in appearance, or the error may occur the first time that the prescription is being filled. In other instances, the patient may simply fail to notice the mistake because differences in size and/or color of the pills are difficult to detect, particularly if the patient has less than perfect vision.

Errors in the filling of prescriptions can arise from a variety of circumstances. In many instances, the error can be attributed to the inattention of the pharmacist, particularly during times when there is a need to fill a large number of prescriptions. Also, the error can be occasioned by the lack of experience of the pharmacist with the particular prescription, or the general lack of experience of the pharmacist's assistant. Other errors can be caused by the similarity of unrelated pills in color and/or shape. Errors can also arise from name similarities, e.g., Feldene/Seldane, Lodine/Codeine, or Prilosec/Prozac.

Errors by pharmacists will continue to occur. Those errors that are not caught by the patient as least deprive the patient of the benefit of the prescribed medication. At worst, the errors can result in death or serious injury. In addition, malpractice errors can result in considerable expense to the negligent pharmacist, or his or her insurer.

Due to the large number of prescription drugs, elimination of pills with similar colors, shapes and/or names is mathematically impossible. In fact, the extent of the problem will increase over time as new drugs become available. Human error will also continue. Therefore, there is a pressing and increasing need for a means to detect erroneously filled prescriptions.

SUMMARY OF THE INVENTION

The present invention is directed to improved containers for prescription drugs, and in particular to improved prescription drug containers incorporating means to aid the pharmacist and the patient in noting when an error has been made in the filling of the prescription.

The present invention is particularly directed to prescription containers to the kind used to hold prescription medicines sold in solid form, e.g., pills, tablets, caplets, suppositories, or capsules. These medications in solid form will be referred to herein for convenience and brevity, as pills. Generally, these containers are comprised of a receptacle into which the pills are placed through an opening, a cap or cover attachable over the opening and a label that is affixed to the receptacle. It will be understood, however, that the concepts forming the basis of the present invention can also be applied to medications in non-solid forms, such liquids, ointments, or gels, etc., and to other receptacle configurations.

The receptacle is normally of a cylindrical shape, having a continuous side wall with continuous upper and lower edges, and a bottom wall or base extending across the lower edge of the side wall. The receptacle is normally threaded adjacent the upper edge of the side wall to receive a correspondingly threaded cap used to close the receptacle opening formed by the upper edge of the side wall.

The wall may be threaded on its outer surface, its inner surface, or both, depending upon the particular cap design. Additionally, the wall may include locking projections on its exterior surface adjacent the upper edge, forming part of a childproof locking mechanism. Usually, the wall and bottom are integrally molded from a transparent, colored plastic.

The cap is normally molded from an opaque plastic material and is designed to be secured over the receptacle opening. Usually, the cap is comprised of a planar top wall with a circular periphery, and a continuous integral side wall that extends downwardly from the periphery of the top wall. The side wall may be internally or internally threaded to join with the receptacle.

The cap may be simply threaded or screwed onto the top of the receptacle. In so-called childproof caps, the interior of the cap side wall is normally threaded and includes locking projections to join with external locking projections on the corresponding receptacle. These locking projections function in a known manner and are not per se a part of the present invention.

In some designs, the receptacle is internally and externally threaded. The cap used with these receptacles includes a first continuous wall designed to fit around the exterior of the receptacle. In addition, the cap includes a second continuous wall, integrally joined to one edge of the first wall by a horizontal flange, to fit into the interior of the receptacle. In this design, the cover will normally extend across the exterior edge of the second wall to enclose the receptacle contents.

When a prescription is to be filled, the pharmacist, or his or her assistant, selects a large container of pills corresponding to the medication to be prescribed, transfers the designated number of pills from the large container to a receptacle, and caps the receptacle with its matching cap. An instruction sheet may also be included on or in the receptacle. The pharmacist or assistant then types information about the prescription onto a label, and attaches the label to the wall of the receptacle.

Labels are normally pre-printed with standard information common to all prescriptions filled at the particular pharmacy, including the name, address and telephone number of the pharmacy. Information unique to the prescription, such as the patient's name, doctor's name, the name of the prescribed medicine, instructions for use, number of refills, etc., are then typed onto the label at the time the prescription is filled.

Historically, pre-printed labels were supplied in rolls, and the unique information was typed onto the label using a typewriter. Today, the unique information may typed onto the label using a computer equipped with conventional word processing software. However, most modern pharmacies use either a computer equipped with software especially designed to print labels, which may be a normal desktop computer, or a computer especially designed for this purpose. Output from the computer is sent to a conventional printer, such as an ink jet or laser printer, or a label printer especially designed to print labels.

The present invention is directed to two modifications of the above containers and the related procedures for their preparation that may be used alone or in combination to significantly increase the likelihood that the pharmacist or the patient will detect an error in filling the prescription in question. One of these improvements relates to an improved cap forming a part of this type of container, while the other improvement, which can be used alone or with the cap improvement, relates to an improved label.

With conventional prescription containers such as described above, the contents of the container is difficult to see since the receptacle, while usually transparent, is of a bronze or other color to protect the contents from deterioration caused by light. Additionally, the contents are at least partially hidden by the opaque container cap and the label covering most of the receptacle side wall. Thus, the patient, as well as the pharmacist, is prevented from seeing the container contents.

Ready identification of the container contents is further restricted by the size of the pills and the fact that any identification on the pills, such as the drug name, is in a small font, and may be impressed into the pill during manufacture so that the name is the same color as the pill. If the pharmacist could easily see the pills in containers that have been filled by others, such as his or her assistants, and if the patient could easily see the contents at the time of purchase, many of the errors could be caught before the pills are ingested.

Unlike prior art prescription container caps, the caps of the present invention facilitate viewing of the interior contents, by creating a separate pill chamber within the cap, with the chamber including a transparent covering so that the contents of the cap can be easily viewed. At the time the prescription if filled, the person filling the prescription places one pill from the prescription in the chamber.

Preferably, the cover is clear to facilitate viewing of the interior contents. However, a transparent covering of a bronze or other shading is also contemplated by the invention, so that the contents of the chamber can be protected from exposure to light. Additionally, the chamber top includes a magnifying lens, permitting the viewer to more easily read any indicia on the pill within the chamber. Use of UV blocking plastic as the material for the entire vial or at least the cap or cover is also contemplated.

UV light penetration can also be minimized by inverting the vial when it is place on the counter or other surface. If this procedure is used, a cap having an outer edge with a diameter greater than the diameter of the vial may be used for improved stability. In addition, the label may be attached upside down on the vial, e.g., with the bottom edge of the label toward the vial cap, to remind the user to invert the vial.

Thus, the cap is comprised of a transparent top cover through which the contents of the chamber can be viewed, and means for attaching the cap over the receptacle opening. Preferably, the transparent cover includes a magnifier. The cap preferably also includes a chamber beneath the transparent cover for holding a pill for viewing.

Alternatively, instead of positioning a magnifier within the cap, a conventional prescription vial or container cap can be used, and the magnifier can be positioned or formed in the bottom wall of the container transverse to the longitudinal axis of the vial. In this embodiment, a support wall can be positioned transversely across the vial above the bottom wall.

UV light penetration can also be minimized by covering the cap or the magnifying lens with a removable cover, which may be as simple as a peel off cover. However, in order to facilitate covering of the cap or magnifying lens when the lens is not being used, the UV protective covering is preferably hinged, so that it can be moved from over the lens during use, and then rotated or pivoted back into place. That is, the covering can be hinged at one edge to pivot upward, or to rotate along a horizontal plane.

For example, the cap can be formed of a continuous side wall having an upper edge and a lower edge, a lower cover extending across the side wall intermediate the upper and lower edges, threads on the side wall between the lower cover and the lower edge, and a detachable transparent top cover including a magnifier across the side wall.

With this configuration, a chamber is defined by the upper and lower covers and the continuous side wall. This chamber may be accessed by detaching, i.e., opening the top cover to insert a pill. The pill can then be viewed through the transparent top cover, with the details of the pill being magnified for easy identification.

The threads can be formed on the interior or exterior surface of the cap, depending upon the particular container design. In addition, the cap can include a component of a locking means to render the cap childproof, with the corresponding component of the locking means being located on the receptacle.

After reading this disclosure, other cap configurations will become apparent to one skilled in the art. The exact means for attaching the cap to the receptacle is not critical to the present invention, so long as the cap or end wall includes a magnifier, i.e., a transparent convex portion which increases the apparent size of the pill in the chamber when viewed through the magnifier, and preferably a pill chamber beneath the transparent covering to hold the pill.

Another aspect of the invention relates to the labeling of the prescription to reduce errors. In the present invention, labels for the prescription containers are prepared, as with the prior art, using a processor, e.g., a desktop computer, or a computer especially designed as a label printer. The label is operatively connected to a printer, which may be a standard ink jet, bubble or laser printer, or a printer especially designed to print labels.

The processor, like the prior art, also includes software to format the labels. Unlike the prior art, the software used in the present invention is especially written to recognize the names of drugs as the drug names are typed onto the labels, and includes a database comprised of graphic images of various drugs. The software is written to compare drug names as the names are typed onto the labels and select an image of a pill corresponding to the drug name. The software then instructs the printer to print a color image of the pill onto the label during printing.

The software may be word processing software that includes the graphic image database. As each letter of the drug name is typed, the software narrows the numbers of possibly correct images by selecting those images having identifying names that include the letters typed. The number of possible images is diminished each time a letter is typed, until only one possible image exists when the entire name has been typed. The software, upon receiving a print signal, then prints this remaining image onto the label at the time the textual matter is printed.

Various programs can be written to accomplish the above objective. For example, the word processing component of the software, the graphic database, and the linking instructions used to select the appropriate image based upon letters typed, can be written as a single software program. Alternatively, a conventional software program can be used, with auxiliary graphic image software being added to respond to the word processing software.

Also, the graphic image software can read the entire drug identifying word at the time the label is to be printed, instead of one letter at a time as the information is being typed into the processor on the keyboard. Instead of typing the name of the drug, the operator can use a conventional pull-down menu or other menu that lists the drug names. The operator will then select the appropriate name from the menu, with the graphic image software being responsive to the drug name selected.

Preferably, the software will also display the image of the medication or pill on the computer screen when the pill is selected. Thus, the operator will be able to view the pill image and the typed information together before the label is printed. Since the software automatically selects the pill image at the time the name of the pill is typed into the processor, errors are virtually eliminated. If a typographical error is made, the software will not display or print a pill image, unless the typographical error corresponds exactly to the name of a stored pill image.

In this latter instance, which could occur if the operator intentionally types in the wrong drug name, the image of a pill would be displayed and printed. However, the operator, who will normally be familiar with the image of the desired pills, will be alerted by the pill image that an error has been made. In addition, the ability of the operator, pharmacist and/or patient to view the actual pills in the vial along with the pill image on the label serves to eliminate even this unlikely error.

In order to facilitate comparison, the image of the pill is preferably of the same size and color as the actual pill. However, the image can be larger or smaller than the actual pill. Additional information or instructions can also be printed, such as the indicia, name, or other identifying information that is printed onto, or impressed into, the pill. Also, wording or colors can be used to draw the user's attention to the pill image. For example, a word such as VERIFY can be added to the label, and as part of the label can be printed in red or another contrasting color.

Thus, the completed label, in addition to the name of the drug and other general and specific information of the type normally found on a prescription label, will also include an image of the pill present in the labeled container. The patient, before taking a pill, only needs to compare the actual pill with the pill image on the label to determine if the pills match. If so, the patient can be confident that the name of the pill on the label is the same as the pill in the container.

Therefore, in this aspect of the invention, the complete container will be comprised of a receptacle containing the given medication, a cap to close the receptacle, and a label attached to the receptacle, the label having printed thereon the name of the given medication and an image corresponding to the medication.

When combined with the above-described cap in another aspect of the invention, the final product will be comprised of a receptacle containing a plurality of a given pill; a cap to close the receptacle, the cap including a chamber with a transparent cover containing one of the given pills; and a label attached to the receptacle, the label having printed thereon the name of the given pill and an image of the pill. Preferably, the transparent cover is in the shape of a magnifying lens to facilitate comparison of the pill in the chamber with the image of the pill on the label.

When a prescription is correctly filled, the pharmacist or assistant will select the supply container containing the prescribed drug, and transfer the prescribed number of pills to a receptacle, placing one on the prescribed pills in the chamber of the cap. The name of the prescription drug and other related information will be entered into the computer software, e.g., by typing the information with the keyboard of a processor, selecting the information from a menu or other database source, or a combination of methods, for printing onto a label.

As the name of the drug is entered, the software will compare the drug name with a database of medication or pill graphic images, and select the image corresponding to the name of the typed drug. When the signal is sent from the processor to the printer, the printer will also be instructed to print a color image of the pill or other medication onto the label, e.g., near one corner of the label. An image of the pill may also be displayed on the computer monitor prior to printing of the label.

The same steps will be followed if the pharmacist or assistant selects the wrong supply container. However, when the product is complete, the pharmacist, or the patient, needs only to compare the actual pill housed in the cap chamber with the image of the pill on the label to realize that an error has been made. Additionally, the patient can compare the contents of the receptacle with the label image at the time the medication is consumed. For example, the patient can hold a pill in his or her hand, and view the pill with the magnifying cap, to compare the pill and image.

The prescription labels can be individual rectangular labels, or a roll of labels that are attached to each other, or to a common base. However, the present invention also contemplates the use of labels that can be sized to fit vials of different diameters and heights, with the entire wall of the vial being covered by the label to prevent UV light penetration through the vial wall. With the use of this label, and a covering over the magnifier, the entire vial can be made of clear plastic.

Vials of different heights and/or diameters are ordinarily used by a pharmacy to accommodate prescriptions of a different number of pills, and pills of different sizes. Thus, a prescription for a large number of pills and/or pills of a large size would be placed into a large container, while a prescription for a smaller number of pills and/or pills of a relatively smaller size, would be placed in a smaller container.

In accordance with the present invention, a label having vertical and/or horizontal perforations in addition to the normal separating perforations is used. When the label is to be applied to a large container, the entire label is printed and applied. However, when the label is to be applied to a small container, the information is printed on a part of the label, and the unused portion of the label, vertically and/or horizontally, is detached prior to attachment of the label to the vial.

Selection of a label of the correct size, and thereby printing of the label information onto the appropriate portion of the label is achieved with software that selects the position of the print based upon the identity of the drug and the size of the prescription entered by the operator. The software used for this purpose can form a part of the software discussed above, with the printing position being determined by the software at the same time the correct pill image is selected.

For example, if the operator enters the name of a drug having a relatively large pill dimension and/or a larger number of pills, the software will determine that a large vial will be required, and the information can be printed on the entire label. However, if the operator enters the name of a drug having a relatively small pill dimension and/or a smaller number of pills, the software will limit the printing to the smaller dimension of the label. In this latter instance, the operator can tear off the unused horizontal and/or vertical sections of the label before applying the label to the vial.

The preceding and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
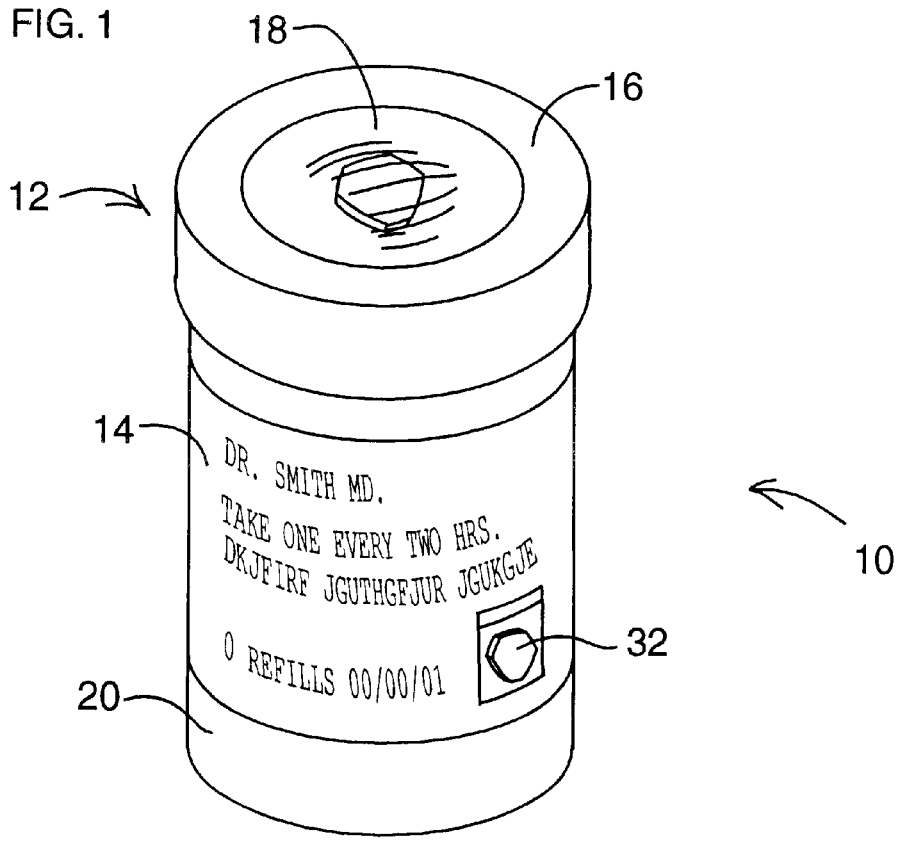
FIG. 1 is a perspective view of a prescription container showing one form of the cap of the present invention in combination with the label of the invention.
Figure 2:
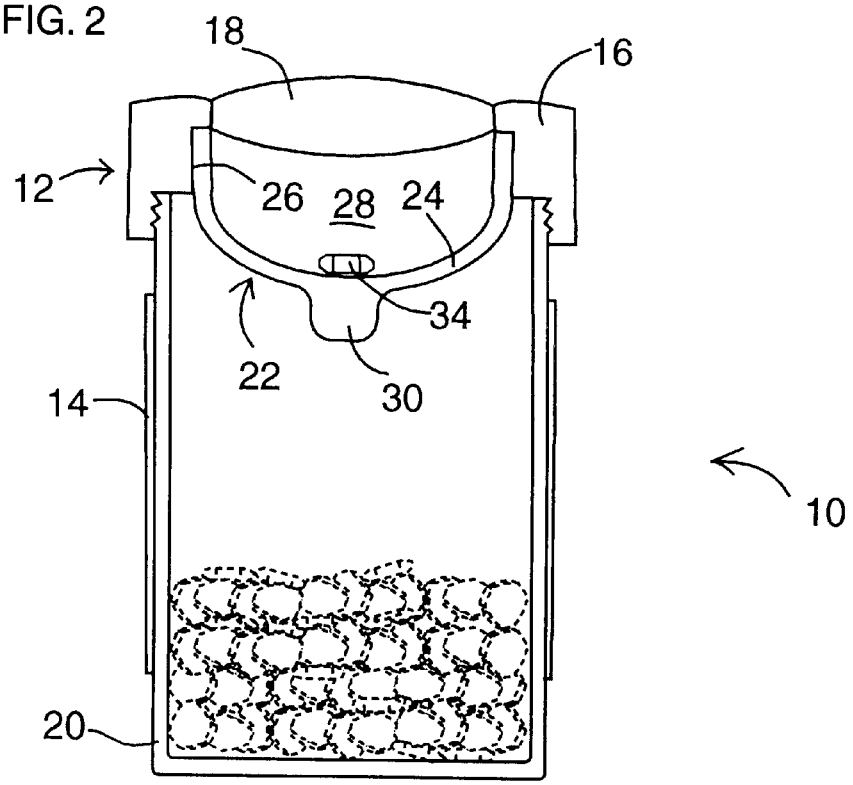
FIG. 2 is sectional side view of the container of FIG. 1.

FIGS. 1 and 2 of the drawings illustrate a prescription bottle, generally 10, embodying both a cap, generally 12, and a label 14 of the present invention. Cap 12 is comprised of an annular rim 16 having a central opening into which is fitted a magnifying lens 18 positioned transverse to the longitudinal axis of an attached receptacle 20. Rim 16 is internally threaded for attachment to externally threaded receptacle 20.

Cap 12 further includes a pill holder 22 having a continuous curved wall 24 terminating in an opening defined by a terminal edge adapted to be frictionally inserted into engagement with an inner wall 26 of rim 16 to create a pill chamber 28 beneath lens 18. Holder 22 also includes a central tab 30 centrally positioned on the exterior of wall 24 to facilitate insertion and removal of holder 22 into rim 16.

Label 14 includes information about the patient and the product including the product name or other product identification. Additionally, and unique to the present invention, label 14 also includes a printed picture 32 of a pill that corresponds the product name printed on label 14, with the appropriate image being selected responsive to the drug name entered during label preparation. Both the product name and picture 32 are printed onto label 14 at the time the prescription is filled. A pill 34, is also shown positioned within chamber 28 for comparison with picture 32.

Figure 3:
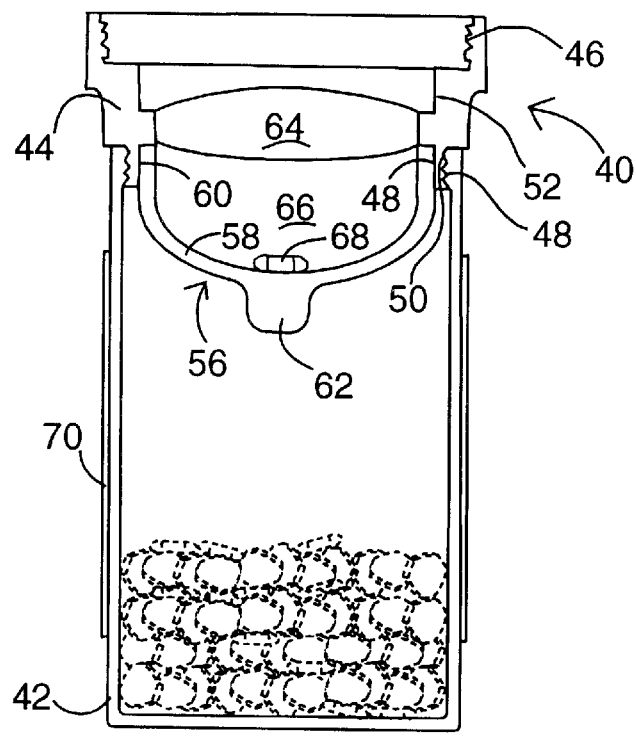
FIG. 3 is a sectional side view of another prescription container with a different cap embodiment.

FIG. 3 illustrates another embodiment of the invention using a cap, generally 40, which can be used either as a childproof cap, or as an adult cap. Cap 40 is illustrated attached to a receptacle 42 in the "adult" position. Cap 40 is comprised of an annular rim 44 with opposed open ends. One end of rim 44 terminates in an internally threaded, continuous inner wall 46 for attachment to external threads of a receptacle like receptacle 20, illustrated in FIGS. 1 and 2. The opposed end of rim 44 terminates in an exterior threaded, continuous outer wall 48 for attachment to internal threads 50 of receptacle 42.

Rim 44 further includes a first continuous internal attachment wall 52 immediately inside of, and adjacent to, wall 46. A second continuous internal attachment wall 54 is located immediately inside of, and adjacent to, wall 48. Walls 44, 46, 52 and 54 are all circular, and have a common central axis. As illustrated, walls 52 and 54 are of the same diameter.

Cap 40 also includes a pill holder 56, having the same configuration as holder 22 of FIGS. 1 and 2. Holder 56, in this embodiment, includes a continuous curved wall 58 terminating in an opening defined by a terminal edge 60, and a central tab 62 centrally positioned on the exterior of wall 26 to facilitate insertion and removal of holder 56. Edge 60 is sized to be frictionally inserted into rim 44 against either wall 52 or 54, depending upon the manner in which cap 40 is to be used.

A magnifying lens is 64 is positioned within the interior of rim 44 between walls 52 and 54, and transverse to the central axis of cap 40. As illustrated in FIG. 3, edge is frictionally inserted into engagement with the inner surface of wall 54 to create a pill chamber 66 beneath lens 64. A pill 68 is shown positioned within chamber 66 and spaced beneath lens 64. Label 70 that includes an illustration of a pill corresponding to the printed name of the medication is attached to the outer wall of receptacle 42.

Figure 4:
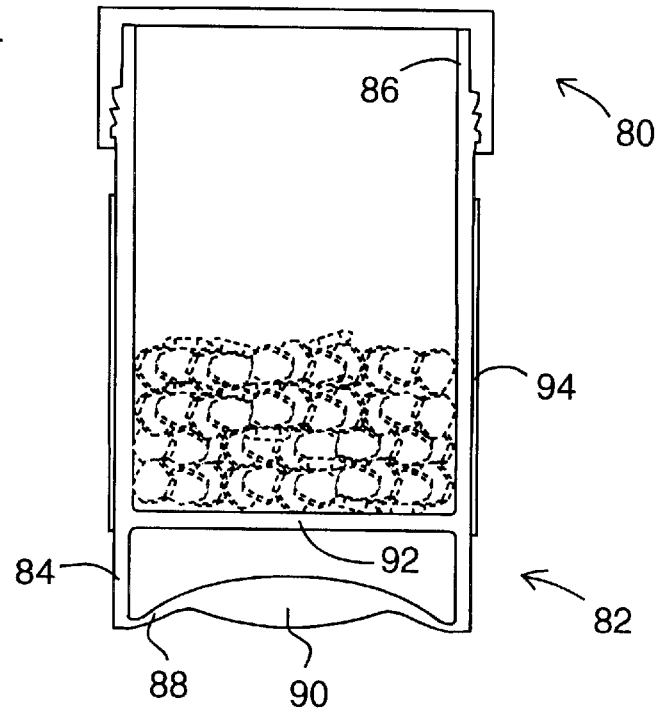
FIG. 4 is an embodiment of the invention is which the magnifier lens is positioned in the bottom of the prescription container, and used in combination with a conventional lens.

FIG. 4 illustrates an embodiment of the invention in which a conventional cap, generally 80, is attached to a receptacle, generally 82, formed of a continuous side wall 84 that terminates in an externally threaded upper edge 86. Cap 80 includes an internally threaded rim 86 that attaches to edge 86. Receptacle 82 also has a bottom wall 88 that includes a central magnifying lens 90 oriented transverse to the longitudinal axis of receptacle 82, and a transversely oriented pill support wall 92 spaced above lens 90. A label 94 is attached to the exterior of wall 84. Label 94 may be of a design like label 14 in FIGS. 1 and 2, with a printed picture of a pill corresponding to the name of the medication printed on label 94.

In preparing a prescription in accordance with the present invention using the container illustrated in FIGS. 1 and 2, the pharmacist, or his or her assistant, selects the appropriate supply container of the desired pills and inserts all but one of the prescribed number of pills into receptacle 20. The remaining pill 34 is then placed in holder 22, which is frictionally secured to rim 16 of cap 12, and cap 12 is attached to the top of receptacle 20.

A label for the container is prepared using a computer or processor that includes a stored database of pill images, and software for identifying names of drugs typed or entered into the processor during label preparation, and for selecting the pill image corresponding to the drug name that is entered at the time the name is entered.

After entering the information for the label, the processor is instructed to print the label on an attached printer. Upon receipt of the print instruction, the processor transmits to the printer print instructions including the entered information and an image of a pill corresponding to the name of the medication to be typed onto the label. Both the typed information and a colored picture of the selected pill are then printed by the printer onto a form label. An additional image can be printed on any instructional material.

After the label is attached to the container, the pharmacist can look through the lens at pills in the container, or at a representative pill in the chamber beneath the magnifier, and compare the pill with the printed image of the pill on the label to ensure that they match. Similarly, the patient, upon receiving the prescription, can make the same comparison. If the incorrect supply container is selected, the representative pill and the picture will not match, thereby immediately alerting the pharmacist, or the patient, to the fact that an error has been made.

The embodiment of the invention in FIG. 3 is used in the same manner as the embodiment of FIGS. 1 and 2, with holder 56 being attached to the side of rim 44 to be attached to receptacle 42.

The embodiment of the invention illustrated in FIG. 4 utilizes the same principles, but is used in a slightly different manner. With this embodiment, all of the prescribed pills are placed inside receptacle 82 and cap 80 is attached. Label 94 is prepared at described above for the embodiment of FIGS. 1 and 2. When comparing the actual pills with the picture on the label, however, the pharmacist raises container and views the pill through lens 90 with the container in an upright position. Support wall 92 spaces the pills in receptacle 82 above lens 90 to achieve the desired magnification.

Figure 5:
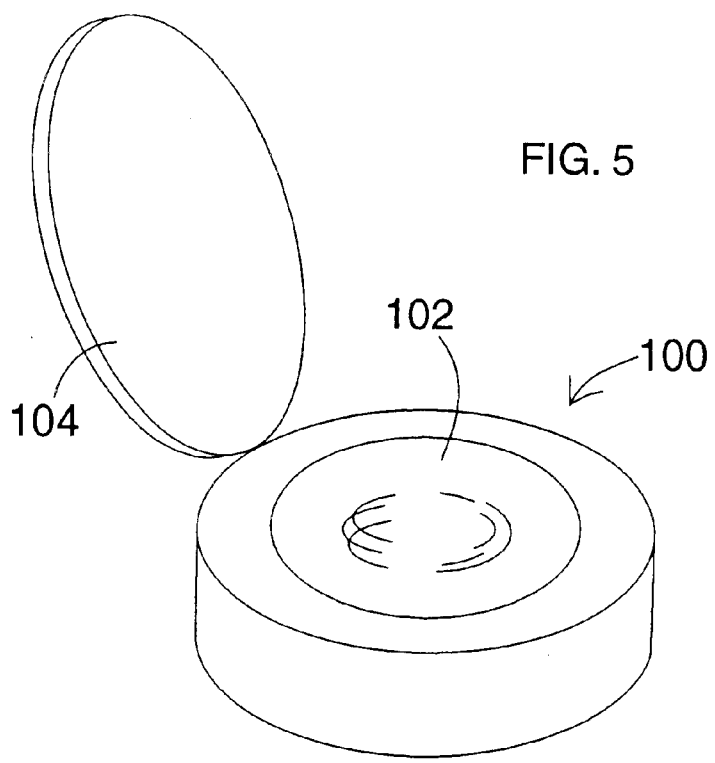
FIG. 5 is an alternative cap including a hinged cover for the magnifier.
Figure 6:
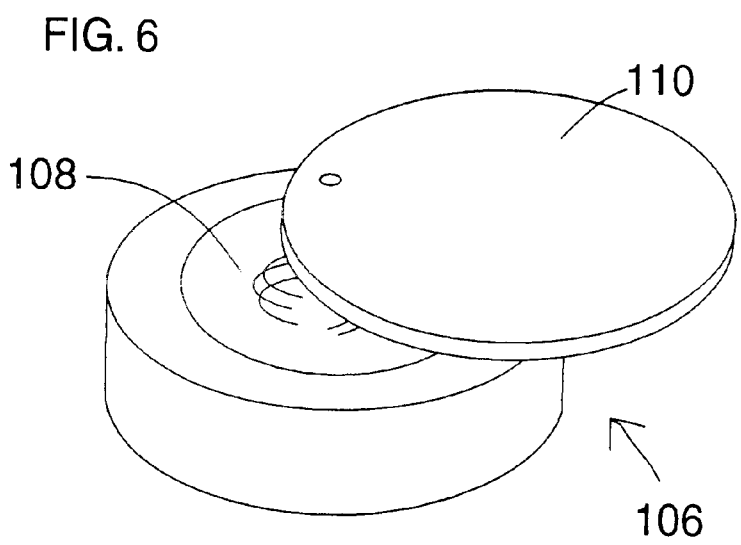
FIG. 6 is an alternative cap including a rotatable cover for the magnifier.

FIG. 5 illustrates an alternative cap 100 that includes a magnifier 102 and a hinged cover 104 that can be pivoted over magnifier 102 during storage. FIG. 6 illustrates an alternative cap 106 that includes a magnifier 108 and a rotatable cover 110 that can be rotated along a horizontal pathway to cover magnifier 108 during storage.

Figure 7:
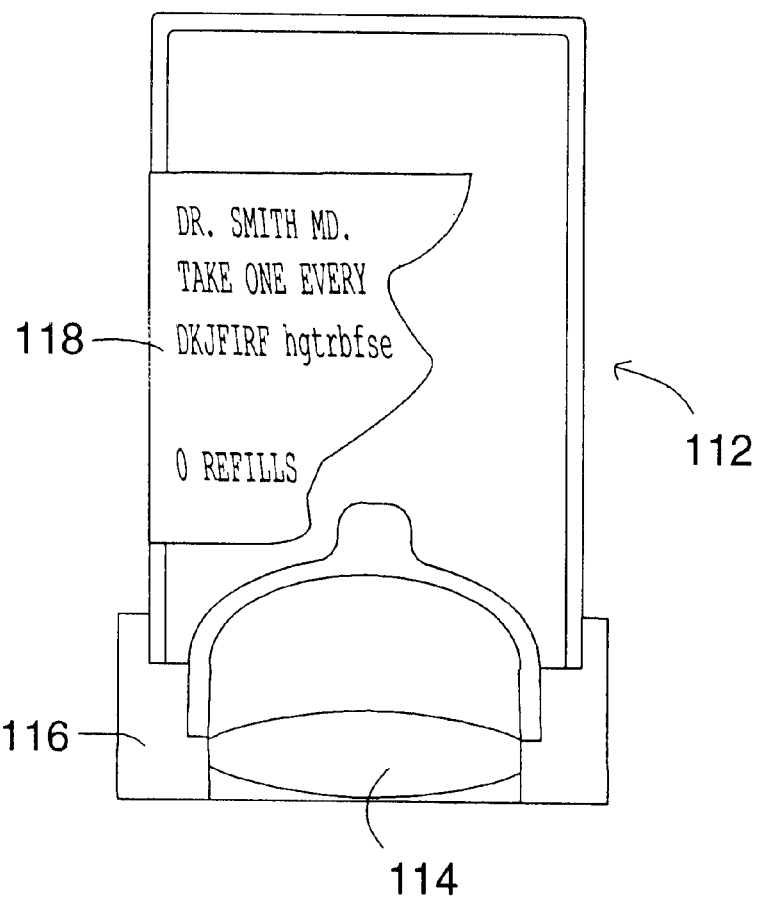
FIG. 7 is an alternative embodiment of the container adapted to be placed on surface in an inverted position to prevent UV penetration through the magnifier.

FIG. 7 is an alternative embodiment of a container 112 adapted to be placed on surface in an inverted position to prevent UV penetration through magnifier 114 in cap 116. Label 118 is attached to container 112 in the inverted position.

Figure 8:
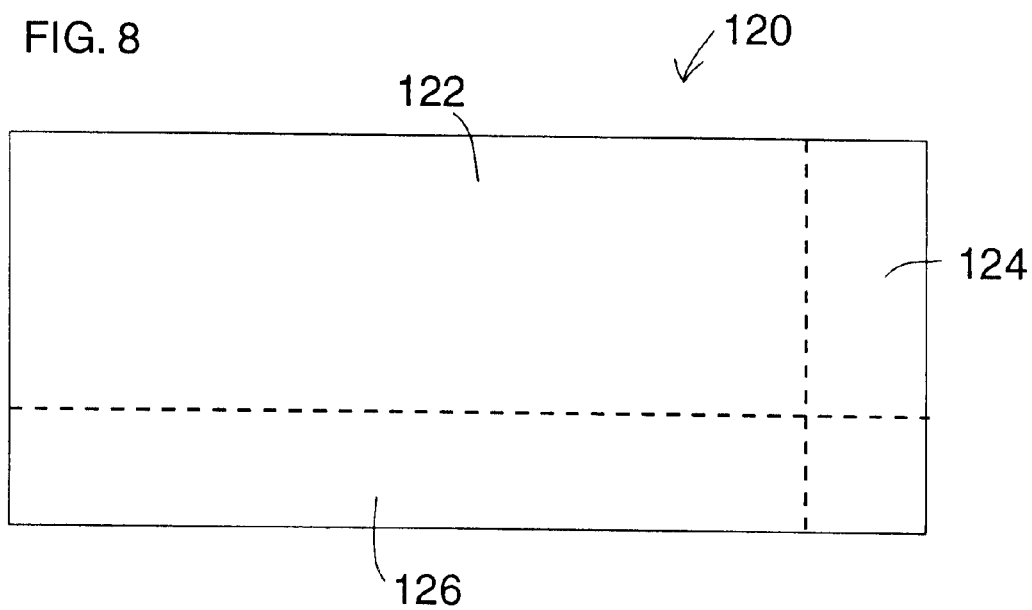
FIG. 8 illustrates a label that can be used to cover vials of different heights and diameters.

FIG. 8 illustrates a label 120 that has a given height and width. Label 120 includes a center portion 122 that also has a given height and width. Label 120 also includes a vertical segment 124 and a horizontal segment 126. When using a larger vial having a height and circumference corresponding to the given height and width of label 120, the entire label 120 will be used. However, if a smaller vial with a height or circumference corresponding to the given height or width, respectively, of center portion 122 is used, segment 124 and/or 126 can be detached from the label so that the dimensions of the label will correspond to the dimensions of the vial. Also, using the software, the information will only be printed on the part of the label to be used.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A container for holding a prescription medication comprising:
   a) a receptacle having an outer wall;
   b) a label on said outer wall, said label including the name of said prescription medicine, and an image of said prescription medication;
   c) a removable cap with a magnifying lens forming a part of said removable cap and;
   d) a removable cover for said magnifying lens.

2. The container of claim 1, wherein said label is rectangular and said image is printed adjacent one corner of said label.

3. The container of claim 1, wherein said image is of approximately the same size, shape and color as said prescription.

4. The container of claim 1, wherein said removable cover is a hinged cover.

5. The container of claim 1, wherein said removable cover is a rotatable cover.

6. A container for holding a prescription medicine in pill form comprising:
   a) a receptacle having a continuous side wall with an upper edge forming an opening into said receptacle;
   b) a label attached to said side wall, said label having printed thereon the name of said prescription medicine and an image of one of said pills;
   c) a removable cap covering said opening, said cap including a magnifying lens whereby the pills in said receptacle are viewable through said magnifying lens while said cap is attached to said container, enabling a user to compare the appearance of said pills with said image and;
   d) a removable cover for said magnifying lens.

7. The container of claim 6, wherein said label is rectangular and said image is printed adjacent one corner of said label.

8. The container of claim 6, wherein image is of approximately the same size, shape and color as said pill.

9. The container of claim 6, wherein said removable cover is a hinged cover.

10. The container of claim 6, wherein said removable cover is a rotatable cover.

* * * * *